(12) United States Patent
Diehl et al.

(10) Patent No.: US 11,511,495 B2
(45) Date of Patent: Nov. 29, 2022

(54) FUNCTIONAL ELEMENT

(71) Applicant: PROFIL Verbindungstechnik GmbH & Co. KG, Friedrichsdorf (DE)

(72) Inventors: Oliver Diehl, Usingen (DE); Richard Humpert, Bad Nauheim (DE)

(73) Assignee: PROFIL VERBINDUNGSTECHNIK GMBH & CO. KG, Friedrichsdorf (DE)

( * ) Notice: Subject to any disclaimer, the term of this patent is extended or adjusted under 35 U.S.C. 154(b) by 0 days.

(21) Appl. No.: 16/800,569

(22) Filed: Feb. 25, 2020

(65) Prior Publication Data

US 2020/0189206 A1 Jun. 18, 2020

Related U.S. Application Data

(62) Division of application No. 15/704,642, filed on Sep. 14, 2017, now abandoned.

(30) Foreign Application Priority Data

Sep. 15, 2016 (DE) .......................... 102016117418.1

(51) Int. Cl.
*B29C 65/48* (2006.01)
*F16B 27/00* (2006.01)
(Continued)

(52) U.S. Cl.
CPC ............ *B29C 65/48* (2013.01); *B23P 19/062* (2013.01); *B29C 53/62* (2013.01);
(Continued)

(58) Field of Classification Search
CPC ...... B23P 19/062; F16B 11/006; F16B 27/00; B29C 65/48; B29C 65/78; B29C 66/742;
(Continued)

(56) References Cited

U.S. PATENT DOCUMENTS 3,938,305 A * 2/1976 Jansen .................... B29C 65/80
53/329.4
4,273,606 A * 6/1981 Trilli ...................... B31D 1/026
156/764

(Continued)

FOREIGN PATENT DOCUMENTS

DE 19935853 A1 * 4/2000 ............ B21J 15/323
DE 102012110222 A1 * 4/2014 ............ B21D 37/16
(Continued)

OTHER PUBLICATIONS

Office Action for DE102016117418.*
(Continued)

*Primary Examiner* — Sonya M Sengupta
(74) *Attorney, Agent, or Firm* — Dickinson Wright PLLC

(57) ABSTRACT

An apparatus and a method for attaching functional elements, e.g. composed of metal, to a component, in particular to a component comprising fiber-reinforced plastic, while using a setting head, wherein the functional element has a contact surface provided with adhesive and wherein the adhesive can be supplied to the setting head in individual depots adapted to the functional elements on a carrier band is characterized in that the functional elements are taken over by a guide device and are each pressable to an adhesive depot and are subsequently guidable with the adhering adhesive depots and separately from the carrier band in the setting head to the setting position in front of a setting die.

14 Claims, 5 Drawing Sheets

(51) Int. Cl.
  *B23P 19/06* (2006.01)
  *B29C 65/78* (2006.01)
  *B29C 65/00* (2006.01)
  *F16B 11/00* (2006.01)
  *B32B 7/05* (2019.01)
  *B29C 53/62* (2006.01)
  *B29C 53/80* (2006.01)
  *B32B 37/00* (2006.01)

(52) U.S. Cl.
  CPC .......... *B29C 53/8016* (2013.01); *B29C 65/78* (2013.01); *B29C 66/742* (2013.01); *B32B 7/05* (2019.01); *F16B 27/00* (2013.01); *B32B 37/025* (2013.01); *F16B 11/006* (2013.01)

(58) Field of Classification Search
  CPC ....... B29C 53/62; B29C 53/8016; B32B 7/05; B32B 37/025
  USPC ................................................. 156/759, 760
  See application file for complete search history.

(56) References Cited

U.S. PATENT DOCUMENTS

| | | | | | |
|---|---|---|---|---|---|
| 4,853,075 | A | * | 8/1989 | Leslie | B23P 19/004 156/763 |
| 5,345,747 | A | * | 9/1994 | Raque | B29C 66/24244 53/374.4 |
| 5,419,441 | A | * | 5/1995 | Hirsch | B21G 1/00 209/939 |
| 5,427,460 | A | * | 6/1995 | Kajiya | B65C 11/0289 156/760 |
| 5,470,416 | A | * | 11/1995 | Herring, Jr. | F16B 11/006 156/196 |
| 5,566,446 | A | * | 10/1996 | Luckhardt | B23P 19/001 29/816 |
| 5,980,677 | A | * | 11/1999 | Amo | B32B 37/10 156/247 |
| 6,266,871 | B1 | * | 7/2001 | Edwards | B25B 23/045 29/818 |
| 6,696,147 | B1 | * | 2/2004 | Herring, Jr. | F16B 11/006 428/407 |
| 2012/0087764 | A1 | * | 4/2012 | Diehl | B29C 65/7811 403/265 |
| 2017/0282238 | A1 | * | 10/2017 | Lewis | B23P 19/062 |

FOREIGN PATENT DOCUMENTS

| | | | | | |
|---|---|---|---|---|---|
| EP | 0633825 | B1 | * | 4/1997 | ............. B21J 15/32 |
| EP | 1116891 | B1 | * | 2/2004 | ............. B23P 19/062 |
| EP | 0755749 | B2 | * | 6/2006 | ............. B23P 19/062 |
| EP | 0864396 | B1 | * | 6/2006 | ............. B23P 19/001 |
| EP | 2439055 | A2 | * | 4/2012 | ........... B29C 65/485 |

OTHER PUBLICATIONS

Patent Family for WO2019022101.*
English translation of Search report for EP17189887.*
English translation of Written opinion for EP17189887.*
English translation of DE102012110222A1.*

* cited by examiner

FUNCTIONAL ELEMENT

CROSS-REFERENCE TO RELATED APPLICATIONS

This application is a divisional application of, and claims priority to, U.S. patent application Ser. No. 15/704,642, filed Sep. 14, 2017, which claims priority to German Patent Application No. 102016117418.1, filed Sep. 15, 2016, the disclosures of which are incorporated herein by reference in its entireties.

FIELD OF THE INVENTION

The present invention relates to an apparatus and to a method for attaching functional elements, e.g. composed of metal, to a component, in particular to a component comprising fiber-reinforced plastic, while using a setting head, wherein the functional element has a contact surface provided with adhesive and wherein the adhesive can be supplied to the setting head in individual depots adapted to the functional elements on a carrier band.

BACKGROUND

An apparatus and a method of the above-named kind can be seen from EP 2 439 055 A. It is schematically shown there how adhesive rings are removed from a first carrier band by means of a transfer device and are placed onto a second revolving band. Functional elements are subsequently connected to an adhesive ring placed on the revolving band and are transported to a setting device. The functional elements are buttoned out of the revolving carrier band when the latter is moved about a deflection pulley and is subsequently attached to a plastic component. The schematic illustration does not go into any detail and is relatively complex.

Functional elements composed of metal having a flange of a larger diameter forming an attachment surface and having a centering section arranged within the attachment surface and extending away from the flange are widespread and well-known for use with metallic components such as sheet metal parts. An example can be seen from European patent specification EP 1 116 891 of the present applicant that describes a so-called RND nut. That is, the functional element is formed as a nut element in the named European patent. The centering section is there formed as a rivet section that is deformed after or during the attachment to form a rivet flange.

As part of the endeavor for molded parts of low weight, but high strength, plastic components, primarily in the form of composite materials such as glass fiber reinforced or carbon fiber reinforced plastics, are frequently used today instead of sheet metal parts, with, however, other reinforcing materials also being able to be considered, typically those with high-strength reinforcing fibers or fabrics manufactured using such fibers. Components of such plastics frequently also have to be provided with fastening elements, for which purpose a limited choice of possibilities is already known. In this connection, press-in elements are, for example, known that are typically pressed into matched bores of the plastic material at elevated temperatures of the material. The plastic material flows around the inserts or press-in elements and into undercuts provided there and anchors the inserts in a cold state. The inserts can be provided with an internal thread, for example. Such inserts are admittedly by all means justified, but can mostly only be loaded with limitations since they may otherwise be pulled into or out of the plastic component. The use of such inserts is particularly problematic with relatively thin plastic components. Such fiber-reinforced plastic components or a plastic component reinforced with a fabric are frequently called organic plastic sheets.

It is known from the initially named EP 2 439 055 A to provide a functional element similar to an RND element with an adhesive ring to adhesively bond it to a component, e.g. to a plastic component, in particular to a fiber-reinforced plastic component or to a plastic component reinforced with a fabric. The nut element in accordance with EP 2 439 055 A is admittedly formed as a centering element, but the centering section shown there could also be formed as a rivet section, with the functional element then not only being adhesively bonded to the component, but also being additionally fastenable to the component by beading over the rivet section.

The present invention deals with the application of the adhesive to the functional element and the apparatus claimed here or the method claimed here can in principle be used with all kinds of fastening elements.

Functional elements can by all means also have different forms. For example, a bolt element can have a cylindrical shaft part instead of a thread and said cylindrical shaft part can serve to support a lever, a cable pulley or another component. A hollow element, similar to a nut element, can also be considered in which, instead of a threaded cylinder, a smooth bore is provided that serves for the support of a shaft. Functional elements are furthermore known that can be formed for receiving an inserted pin or clip. Functional elements in accordance with the invention can also be formed for carrying out the corresponding functions.

The provision of adhesive at functional elements can be problematic. Even if the adhesive is accommodated at the functional element in a protected manner or is present in dry form, for example in small mixed capsules of adhesive and hardener that only burst under pressure and form an adhesive activated under pressure or an adhesive hardened in another manner, there is always the risk that the adhesive is damaged or is even lost during the handling of functional elements or during the transport from one work site to another. This risk is also present when the adhesive is present in the form of rings of double-sided adhesive tape.

SUMMARY OF THE DISCLOSURE

It is the object of the preset invention to provide an apparatus and a method that very largely prevents the above-named problem of damage to or the loss of the adhesive.

In accordance with the invention, an apparatus of the initially named kind is provided to satisfy this object that is characterized in that the functional elements are taken over by a guide device and are each pressable to an adhesive depot and are subsequently guidable with the adhering adhesive depots and separately from the carrier band in the setting head to the setting position in front of a setting die.

A corresponding method can be seen from claim 15. When functional elements of e.g. metal are spoken of in this application, it is intended to express that the functional elements typically only consist of metal. It is, however, not precluded that a functional element of fiber reinforced plastic is used, with it also being conceivable to equip such a functional element with a metal core, for example in the manner of a threaded insert.

Since the adhesive is only applied to the functional elements within the setting head or directly before the entry into the setting head, the risk that the adhesive is damaged or is lost or is otherwise impaired, for example by aging, before reaching the setting head is no longer present.

In comparison with the solution in accordance with the initially named EP 2 439 055 A, the distance over which the functional elements provided with adhesive rings are transported can be considerably shorter so that the named risk is even further reduced. The mechanical solution is furthermore considerably simpler; only one carrier band is provided that carries the adhesive depots or adhesive rings and supplies them directly to the guide device.

The apparatus in accordance with the invention is in particular configured such that the guide device comprises a rotatable wheel that has receivers for functional elements and that takes over the functional elements from a guide track of a supply device.

This represents a very compact solution that works reliably and implements a high-quality transfer of the function elements to the setting head with a very short supply distance.

This is, however, not the only possible implementation of the guide device. It can, for example, alternatively be implemented by a revolving conveyor that has receivers for the functional elements and that takes over the functional elements from a guide track of a supply device. In such a case, a deflection roll of the revolving conveyor takes the place of the rotatable wheel and the receivers for the functional elements are located in the revolving conveyor belt and optionally also in the deflection roll. The revolving conveyor could then extend perpendicular or obliquely upwardly away from the deflection roll.

The supply device or its guide track can be formed in a manner known per se by a guide passage or by a guide tube or by a guide rail. In such an embodiment, the functional elements are supplied to the guide device in rows next to one another. Since shape features of the functional elements engage into receivers of the rotatable wheel or of the revolving conveyor, the pressure exerted on the functional elements can be sufficient to rotate the rotatable wheel or to cause the revolving conveyor belt to revolve. I.e. a separate drive for the rotatable wheel or for the revolving conveyor is not required. It is, however, by all means possible to drive the rotatable wheel or the revolving conveyor by means of a stepper motor in accordance with the strokes of the setting head.

As indicated, the carrier band with the adhesive depots is covered with a cover band removable from the adhesive in front of the setting head. The adhesive depots are accordingly well protected as long as they are still covered.

The cover band is preferably separable from the carrier band via a deflection roller, whereby a clean separation can be achieved in the manner of a peeling movement.

The arrangement is in this respect preferably such that the deflection roller is arranged above the carrier band, but beneath a supply device guiding the functional elements to the guide device, and on the inflow side of a mouth piece having or comprising the guide device. This likewise enables a very compact and well protected arrangement with a very short path distance of the elements provided with adhesive.

In this arrangement, the carrier band is preferably led off to the bottom about a deflection roller that is located in a section of a mouth piece having the guide device and is preferably arranged such that the functional elements are movable tangentially to the surface of the deflection roller of the carrier band directly on a guide rail of the mouth piece. In this respect, this movement can be effected by the rotatable wheel or by a revolving conveyor that, on the one hand, is synchronized or can synchronize the movement of the functional elements in accordance with the setting strokes of the setting head and, on the other hand, effects the named tangential transfer of the functional elements and in so doing causes the release of the functional elements from the individual receivers of the rotatable wheel or from the revolving conveyor on their deflection directly above the deflector roller of the carrier band.

It is clear that the adhesive depots and/or the carrier band are/is configured such that the adhesive depots adhere less strongly to the carrier band than to the functional elements. This can be effected, for example, in that the carrier band comprises silicones reinforced with fibers or fabric or has a surface that slides easily and does not stick and is provided, for example with a PTFE coating. As an alternative or in addition to this, the surface of the adhesive ring that is seated on the carrier band can be less sticky than the surface that is intended to adhere to the functional elements.

The integration of the guide device into the mouth piece has the particular advantage that it can be released from the setting head with the mouth piece. The mouth piece of the guide deice is in this respect preferably releasably connected to the setting head by means of a movable latching nose. It is thus connected to the setting head in an easily releasable manner.

The apparatus is preferably configured either to push a functional element immediately into the die channel of the setting head after the application of the adhesive to said functional element or first to bring it into a waiting position in front of the die channel. In both variants, the chain of functional elements can then only be pushed onward by one step, i.e. the rotatable wheel is rotated onward by one reception division or the receivers of the revolving conveyor are moved onward when the setting head opens and permits the introduction of a new functional element into the setting position beneath the setting die.

Since the functional elements located in the guide device contact one another, a secure transport into the setting position is always ensured.

A flushing system can optionally be integrated in the setting head to flush off adhesive residues, that collect in the setting head over time, from the setting head as required.

The attachment of the functional elements into plastic components by means of a setting head can take place using a number of different apparatus. It is conceivable to use the setting head in a press. The setting head on which the component is arranged can be arranged facing upward in a lower tool of the press or in an intermediate plate of the press and the functional element can be pressed from below onto the plastic component by means of the setting head, and indeed toward a die that is held in an intermediate plate of the press or in an upper tool of the press. In this respect, the component can be prepunched in a manner known per se or the functional element can be introduced into the component in a self-punching manner.

The arrangement with the setting head facing upward simultaneously means that the contact surface of the functional element faces upward. This is preferred since the adhesive is transported at least substantially loss-free on the functional elements within the setting head.

It is nevertheless also conceivable to arrange the setting head facing downwardly in an intermediate plate of the press or in the tool of the press and then to provide the die in the lower tool of the press or in the intermediate plate of the press that supports the component from the lower side.

One functional element or a plurality of functional elements can then be simultaneously attached to the plastic component for each stroke of the press. The press can then be set such that it, on the one hand, only closes to the degree required to attach the functional element to the plastic component in the manner in accordance with the invention and, on the other hand, to exert sufficient pressure onto the adhesive to ensure the adhesive function.

Another possibility comprises inserting functional elements into or attaching them to the plastic component by means of a robot. The robot can here, for example, bear an apparatus similar to a setting head that presses the element onto the one side of the plastic component while the plastic component is held on a support or on a die from above or from below that is likewise borne by the robot.

A stationary device can furthermore be used to hold the die and only the setting head can be actuated by the robot. A reverse order would also be conceivable, i.e. the robot presses the die onto the one side of a plastic component whose other side is held by a holder that supports the functional element, for example. If therefore from the top and the bottom or from above and below is spoken of in this specification, this is always to be understood with respect to the representation in the Figures and is in no way to be restrictively interpreted.

it is additionally possible to work with force-operated tongs that press the plastic component and the setting head toward one another or hold a die from the one side of the plastic component and press the setting head onto the plastic component and onto the die from the other side.

Particularly preferred methods for satisfying the object in accordance with the invention can be seen from claims 15 to 18.

BRIEF DESCRIPTION OF THE DRAWINGS

The invention will be explained in more detail in the following with reference to embodiments and to the drawings, which show.

DETAILED DESCRIPTION

Figure 5:
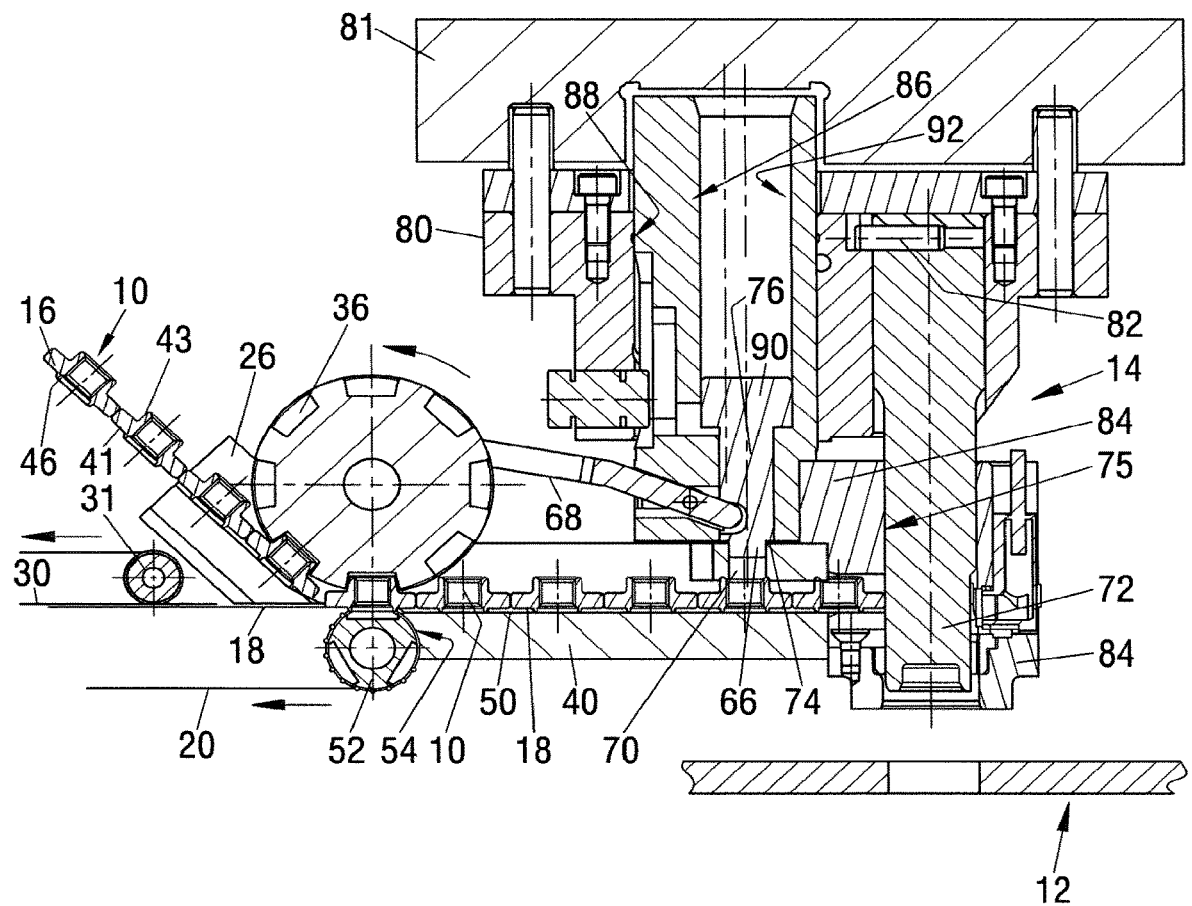
FIG. 5 a detailed, sectional representation of the arrangement in accordance with FIG. 4, but with the mouth piece of the guide device latched to the setting head likewise shown in section.

As can in particular be seen from FIG. 5, the Figures show an apparatus for attaching functional elements 10, e.g. composed of metal, to a component 12 (only visible in FIG. 5), in particular to a component comprising fiber reinforced plastic, while using a setting head 14 (FIG. 5). The component could, however, also be a sheet metal part. The functional elements 10 each have a contact surface 16 to be provided with adhesive. The adhesive is supplied to the setting head 14 in individual ring-shaped depots 18 adapted in shape to the contact surfaces 16 of the functional elements 10 on a carrier band 20.

Figure 3:
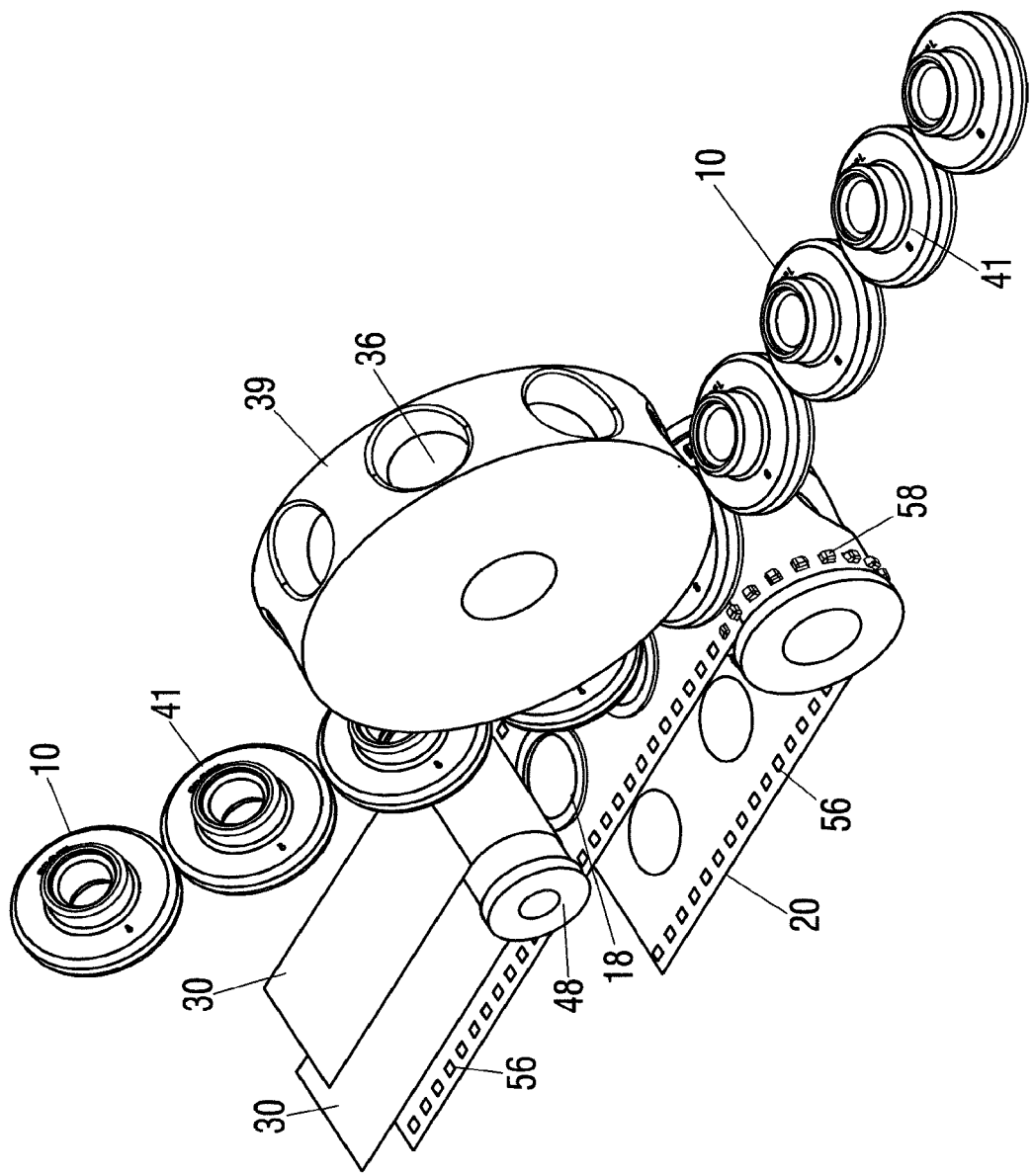
FIG. 3 the same representation of FIG. 2, but additionally with a rotatable wheel that synchronizes and controls the local movement of the functional elements.

The functional elements 10 are supplied to a supply device 24 from a guide passage 22 only shown sectionally and purely schematically in the arrow direction I of a guide device 26 (FIGS. 3, 4 and 5) are taken over thereby and are each pressed to an adhesive depot. The functional elements 10 are with the adhering adhesive depots 18 subsequently separated from the carrier band 20 and are guided into the setting head 14 to the setting position in front of a setting die 72.

Figure 1:
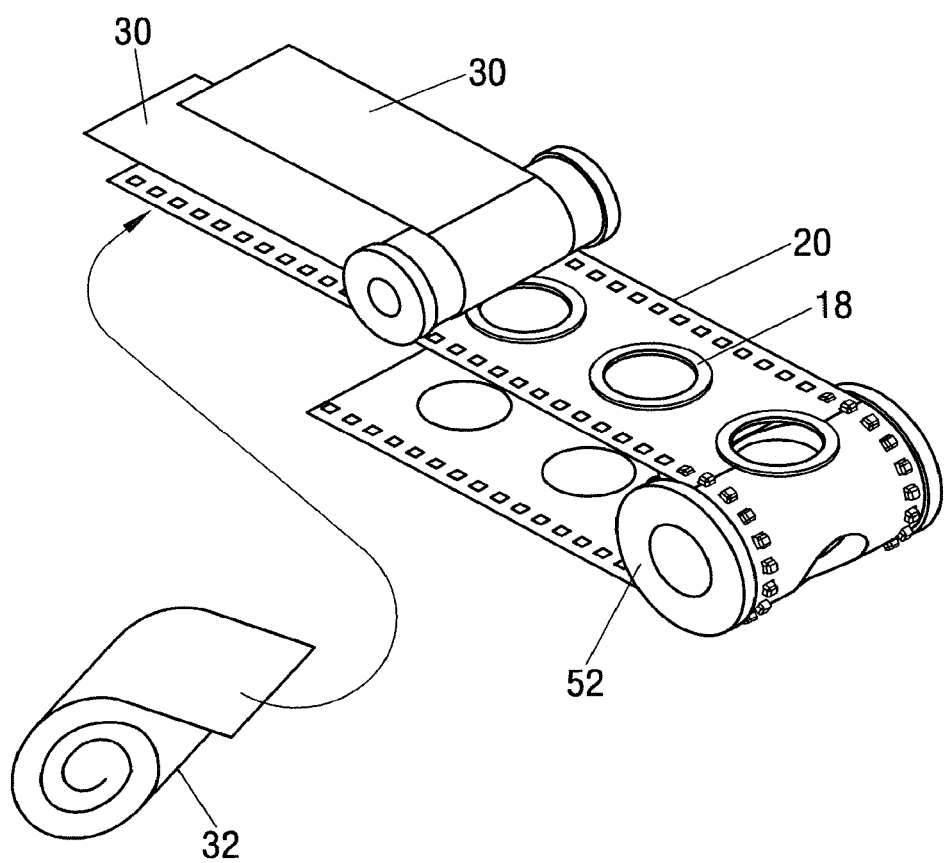
FIG. 1 a perspective view of a carrier band that is removed, for example, from a roll, not shown, wherein the carrier band and the adhesive depots or adhesive rings transported therewith are covered by a removable protective film.

As can be seen from FIG. 1, the carrier band 20 has the shape of a covered band that here carries the ring-shape adhesive depots 18, that is provided with a removal protective film 30 and that is unwound from a roll 32, for example.

The guide device preferably comprises a rotatable wheel 34 (FIGS. 3, 4 and 5) that has receivers 36 for the functional elements 10 and that takes over the functional elements 10 from the guide track 22 (FIG. 2) in that the cylindrical projections 43 arranged above the flanges 41 of the functional elements 10 are received in a respective receiver 36. The receivers are to be designed in accordance with the shape of the functional elements or of parts thereof and sufficient clearance should be available for the functional elements to be properly guided, on the one hand, and to be tangentially released on the revolving movement, on the other hand, as described in more detail below.

Figure 2:
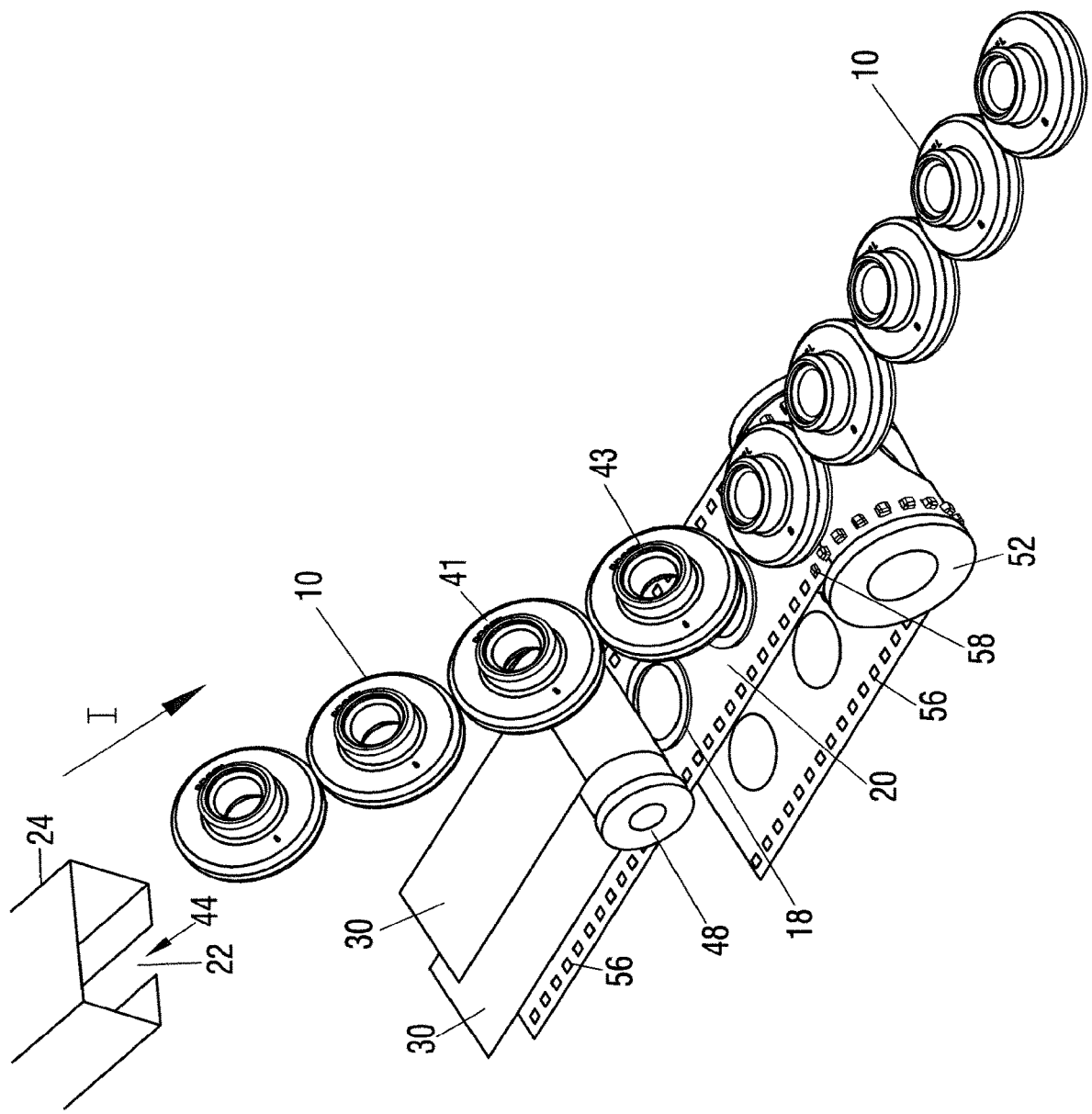
FIG. 2 the carrier band of FIG. 1 with a chain of functional elements in rows next to one another, from which the course of the chain can be seen without covering it by a mechanical structure.

In FIG. 2, the guide track 22 is formed by the passage-shaped supply device 24 that is only shown shortened in FIG. 2. The supply device actually typically extends from a sorting and conveying device, not shown, to the mouth piece 40 shown in FIG. 4 and is fastened, matched in shape, in the open left hand front end 42 of the mouth piece, i.e. in its inflow side. The passage-shaped guide track 22 has a slit 44 at the top in which the cylindrical projections 43 of the functional elements 10 shown here are guided; in this respect, the flanges 41 and the cylindrical projections 43 of the functional elements run in the guide passage 22. Different embodiments of the supply device 24 are also possible; for example, they can be formed by a guide tube or by a guide rail depending on the shape of the functional elements 10 to be transported. The functional elements 10 are, as shown, supplied to the guide device 40 in rows next to one another.

Figure 4:
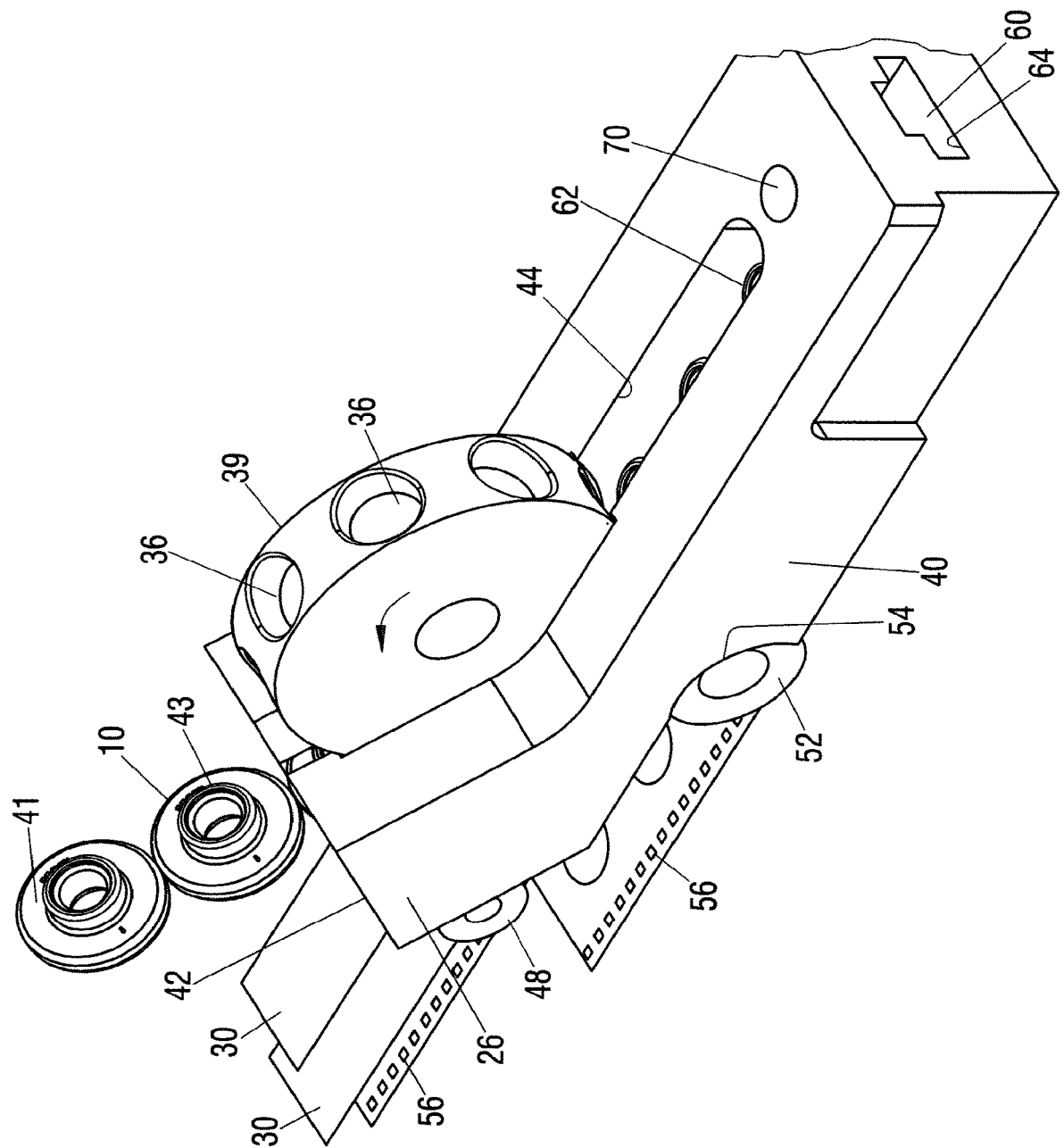
FIG. 4 a representation corresponding to FIG. 3, but now with the rotatable wheel integrated into a mouth piece of a guide device that can be releasably connected to a setting head.

The functional elements 10 can be supplied continuously to the setting head 14 by a storing and conveying unit such as is known from EP-C 864 396 or by lots from a magazine such as is known from EP-B 633825, FIG. 4. The corresponding supply devices are shown in EP-C 864 396. The functional elements 10 can be pushed in the guide passage 22 contacting one another along the guide passage 22 or can be conveyed individually in the guide passage 22 by air blasts in the direction of the setting head 14 such as is shown in EP-B 633 825, FIG. 7.

The setting head 14 shown in FIG. 5 substantially corresponds in its basic characteristics to a setting head known per se, such as is known from EP-C 755 749, in particular from its FIGS. 25 to 38D. A brief description of the configuration of the setting head will be provided at the end of this description.

It is understood that the invention is not restricted to a specific type of setting heads 14 or of the functional elements used therewith, but rather that all setting heads and functional elements known per se that are already known in the industry can be considered. It is only important that the functional elements 10 have a contact surface 12 that can be provided with adhesive 18. Such contact surfaces 12 are frequently of ring shape so that the adhesive depots also have a corresponding ring shape, for example with a center hole that receives the rivet section 46. The adhesive depots 18 can, however, have a different shape when the shape of the contact surface differs from a ring shape or when a different shape of the adhesive depot 18 is desired.

As can be seen from all the Figures, the carrier band 20 with the adhesive depot 18 is covered with a cover band 30 removable from the adhesive in front of the setting head 14. The cover band is separable from the carrier band 20 via a deflection roller 48.

In this respect, as can be seen from FIG. 4, the deflection roller 48 is arranged above the carrier band 20, beneath a supply device 24 guiding the functional elements 10 to the guide device, and on the inflow side 42 of the mouth piece 40.

The carrier band 20 itself is led off to the bottom about a deflection roller 52 and can be wound up again (not shown) and reused. The deflection roller 52 is located in a cut-out 54 of the mouth piece 40 (visible in FIG. 4) comprising the guide device and is arranged such that the functional elements 10 are movable tangentially to the surface of the deflection roller 52 of the carrier band 20 directly on a guide rail 50 of the mouth piece 40 whose end piece 60 can be seen in FIG. 4. The carrier band 20 is preferably provided with lateral perforations 56 in a similar manner to a photographic film into which laterally arranged noses 58 of the deflection roller 52 engage that ensure the transport of the carrier band 20 and synchronize it with the positions of the rivet sections of the functional elements.

The carrier band 20 has a series of holes which are arranged at the same intervals and into which the rivet sections 46 of the functional elements 10 can dip on the attachment of the adhesive depot 18 to the contact surfaces 16 of the functional elements. Corresponding openings can also optionally be provided in the surface of the deflection roller 52 with long rivet sections.

The representation of FIG. 4 is to be understood such that the end piece 60 of the guide rail has a closed base 64.

As already mentioned, the mouth piece 40 of the guide device is releasably connected to the setting head 14 by means of a movable latching nose 66 that can be actuated by means of a hand lever 68. In this respect, the latching nose 66 in the form of a cylindrical pin engages into the bore 70 of the mouth piece 40.

The upper side of the mouth piece 40 specifically has the bore 70 into which a cylindrical latching nose 66 preloaded downwardly by spring force latches and thus prevents the separation of the mouth piece 40 from the setting head 14. The latching nose 66 merges over a ring shoulder 74 into a bolt 76 of larger diameter, said ring shoulder pressing toward the lower side of the mouth piece 40 and thus determining the position of the latching nose 66 in engagement with the mouth piece 40. The hand lever 68 can be operated by the operator to pull the latching nose 66 upward, whereby the mouth piece 40 can be pulled to the left out of the setting head 14 as required. The mouth piece 40 can simply be pushed into the corresponding receiver of the setting head 14 and presses the bolt 76 upwardly with the latching nose 66. As soon as the mouth piece 40 has completely moved into the corresponding receiving position in accordance with FIG. 5, the spring preloaded bolt 76 springs downwardly with the latching nose 66 into the latched position shown in FIG. 5.

In the arrangement shown, the apparatus is configured (as can be seen from FIG. 5) to bring a functional element 10 into four consecutive waiting positions after the attachment of the adhesive 18 to it before they move into the setting position beneath the die 72 of the setting head.

However, this is not necessary. Shortened versions of the mouth piece 40 are by all means conceivable in which the functional elements 10 are pushed into fewer waiting positions or even directly into the setting position, i.e. immediately into the die channel 75 of the setting head beneath the die 72.

The method for attaching functional elements 10, e.g. of metal, to a component 12, in particular to a component comprising fiber-reinforced plastic, while using a setting head 14, wherein the functional element 10 has a contact surface 16 provided with adhesive and wherein the adhesive is supplied to the setting head 14 in individual depots 18 adapted to the functional elements 10 on a carrier band 20, and the operation of the apparatus can be summarized as follows:

The functional elements 10 are delivered to a guide device 26 from a supply device 24 and are respectively pressed to an adhesive depot 18 in the guide device 26. They are subsequently guided with the adhering adhesive depots 18 and separately from the carrier band 20 in the setting head 14 into a setting position in front of a die 72.

In this method, the guide device comprises a rotatable wheel 34 that presses the contact surfaces 16 of the functional elements 10 to the adhesive depots 18.

The carrier band 20 is led off to the bottom about a deflection roller 52 that is located in a cut-out 54 of a mouth piece 40 comprising the guide device and is preferably arranged such that the functional elements 10 are moved tangentially to the surface of the deflection roller 52 of the carrier band 20 directly on a guide rail 50 of the mouth piece 40 or on its base 64.

The carrier band 20 with the adhesive depots 18 is covered in front of the setting head 14 or in front of the mouth piece 40 by a cover band 30 that is removable from the adhesive and that is pulled off the carrier band 20 via a deflection roller 31.

The setting head 14 has, as customary, a fastening part 80 that is fastened by means of screws, not shown, in a tool 81 of a press or to a hand of a robot. The die 72 is fixedly connected to the fastening part 80 of the setting head 14 via a bolt 82, i.e. it does not move with respect to this part. The setting head 14 furthermore comprises a lower part 84 that bears the mouth piece 40 and that is downwardly preloaded by means of spring force in this example. The preloading spring is not shown, but is located within a bore 92 of a guide bolt 86 in this example and is supported, on the one hand, at the tool 81 of the press to which the fastening part 80 of the setting head 14 is attached and, on the other hand, at a piston-like abutment 90 that is arranged at the upper end of the bolt 76. The piston-like abutment 90 is slidable with limitations within the bore 92 of the guide bolt 86 to release the latching nose 66 and presses toward a lower end of the guide bolt 86. The guide bolt 86 is connected to the lower part 84 of the setting head and is axially slidable in a guide cylinder 88 of the upper fastening part 80.

The lower part 84 of the setting head is pushed so far downwardly by the fastening part with an open press that a functional element 10 can be pushed horizontally to the right into the die channel 75, i.e. beneath the lower end of the die 72. As can be seen, the lower end of the die 72 is provided with a receiver for the upper part of the functional element, with this receiver having to be selected in accordance with the shape of the functional element.

The lower part 84 of the setting head is guided, on the one hand, through the die 72 that is guided in the die channel 74 and, on the other hand, through the guide bolt 86 that is slidably arranged in the guide cylinder 88 of the fastening part 80.

When the press closes or when the robot presses the setting head 14 to the component 12, the lower part 74 of the setting head escapes in the direction of the fastening part 80 of the setting head. This movement loads the spring located in the guide bore 92 and the functional element beneath the lower end of the die 72 is attached to the intended position at the component 42.

On each opening stroke of the press, a new functional element 10, that is provided with the adhesive 18, is brought into the setting position in front of the die 72 by the pressure exerted onto the chain of functional elements, a further functional element 10, likewise already provided with adhesive, is brought into the waiting position, and a new functional element 10 is brought into contact with an adhesive ring 18. On the adjoining closing stroke of the press, the functional element 10 located in the setting position is attached to the component 12 by means of the setting die 72, the press opens again and the cycle described directly above repeats on every opening stroke of the press. The rotatable wheel is rotated onward by one position in the same rhythm in this respect with every stroke of the press.

The adhesive can be a commercial one-component adhesive or a two-component adhesive that are usual in the automotive industry. The adhesive types that are named in the initially named EP 2 439 055 A can also be used.

Typical kinds of two (or more) component systems and single-component systems are: Cyanoacrylate adhesives, methyl methacrylate adhesives, anaerobically hardening adhesives, radiation hardened adhesives, phenol formaldehyde resin adhesives, epoxy resin adhesives and polyurethane adhesives.

Adhesive depots or adhesive rings 18 composed of a double-sided adhesive band or in the form of a transfer adhesive can also be used.

REFERENCE NUMERAL LIST 10 functional element
12 component
14 setting head
16 contact surface
18 adhesive depot
20 carrier band
22 guide track, guide passage
24 supply device
26 guide device
30 cover band, protective film
32 roll
34 rotatable wheel
36 receivers
40 mouth piece
41 flange of the functional elements 10
42 inflow side of the mouth piece 40
43 cylindrical projection of the functional elements 10
44 slit of the guide passage 24
46 rivet section of the functional elements 10
48 deflection roller for the cover band 30
50 guide rail of the mouth piece
52 deflection roller
54 cut-out of the guide device
56 perforations of the carrier band 20
58 noses of the deflection roller 52
60 end piece of the mouth piece 40
64 base of the end piece 60 of the mouth piece 40
66 latch nose
68 hand lever for actuating the latch nose 66
70 bore of the end piece 60 of the mouth piece 40
72 die
74 ring shoulder
75 die channel
76 bolt, region of the bolt with a larger diameter
80 fastening part of the setting head 14
81 tool
82 bolt for fastening the die 72 to the fastening part 80
84 lower part of the setting head 14
86 guide bolt for the lower part 84 of the setting head 14
88 guide bore for the guide bolt 86
90 piston-like abutment of the bolt 76
92 bore of the guide bolt 86
I arrow direction

The invention claimed is:

1. An apparatus for attaching functional elements to a component while using a setting head having a setting plunger, the apparatus comprising:
a supply device for supplying the functional elements in a row to a guide device, each of the functional elements having a contact surface and the guide device having a guide rail for feeding the functional elements to a setting position of the setting head in front of the setting plunger,
a carrier band carrying individual adhesive depots provided with an adhesive and adapted to adhere to the contact surfaces of the functional elements,
a movable device at the guide device adapted to bring the contact surfaces of the functional elements into contact with the adhesive depots on the carrier band, to separate the functional elements with the adhesive depots from the carrier band and to move them on the guide rail to the setting head,
the guide rail being present in a mouth piece of the setting head,
the movable device being one of a rotatable wheel with receivers for the functional elements which takes over the functional elements from the supply device, which presses them against the adhesive depots carried by the carrier band and which directly conveys them onto the guide rail of the mouth piece, and a revolving conveyor with receivers for the functional elements which takes over the functional elements from the guide device, which presses them against the adhesive depots carried by the carrier band and directly conveys them onto the guide rail of the mouth piece,
wherein the carrier band consists of a support band carrying the adhesive depots and a removable protective film, the carrier band wound up to form a roll,
wherein the receivers of the movable device in the form of the rotating wheel or the revolving conveyor face radially outwardly from the movable device,
wherein the movable device is integrated into the mouth piece.

2. The apparatus in accordance with claim 1, wherein the functional elements are composed of metal.

3. The apparatus in accordance with claim 1, wherein the component comprises fiber-reinforced plastic.

4. The apparatus in accordance with claim 1, wherein a guide track of the supply device is formed by a guide passage, guide tube, or guide rail.

5. The apparatus in accordance with claim 1, wherein the functional elements are supplied to the guide device in a plurality of rows next to one another.

6. The apparatus in accordance with claim 1, wherein the carrier band with the adhesive depots is covered in front of the setting head by a cover band removable from the adhesive, with the adhesive depots being disposed between the carrier band and the cover band.

7. The apparatus in accordance with claim 6, wherein the cover band is separable from the carrier band via a deflection roller.

8. The apparatus in accordance with claim 7, wherein the deflection roller is arranged above the carrier band, beneath a supply device guiding the functional elements to the guide device and is arranged on an inflow side of the mouth piece.

9. The apparatus in accordance with claim 1, wherein the carrier band can be led off to the bottom about a deflection roller that is located in a cut-out of the mouth piece.

10. The apparatus in accordance with claim 9, wherein the deflection roller is arranged such that the functional elements are movable tangentially to the surface of the deflection roller of the carrier band directly on the guide rail of the mouth piece.

11. The apparatus in accordance with claim 1, wherein at least one of the adhesive depots and the carrier band is configured such that the adhesive depots adhere less strongly to the carrier band than to the functional elements.

12. The apparatus in accordance with claim 1, wherein the mouth piece of the supply device is releasably connected to the setting head by means of a movable latching nose.

13. The apparatus in accordance with claim 1, wherein the apparatus is adapted either to push a functional element immediately into a die channel of the setting head or only to bring it into a waiting position in front of the die channel after application of the adhesive to said functional element.

14. The apparatus in accordance with claim 1, wherein a flushing system is integrated in the setting head to flush adhesive residues out of the setting head as required.

* * * * *